(12) United States Patent
Chae

(10) Patent No.: US 10,260,618 B2
(45) Date of Patent: Apr. 16, 2019

(54) ROTATION SUPPORT STRUCTURE OF PLANETARY GEAR SET FOR POWER TRANSMISSION SYSTEM

(71) Applicant: Hyundai Motor Company, Seoul (KR)

(72) Inventor: Geum Muk Chae, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 267 days.

(21) Appl. No.: 15/348,819

(22) Filed: Nov. 10, 2016

(65) Prior Publication Data
US 2018/0031112 A1 Feb. 1, 2018

(30) Foreign Application Priority Data
Jul. 27, 2016 (KR) .................. 10-2016-0095526

(51) Int. Cl.
| F16H 57/08 | (2006.01) |
| F16H 1/28 | (2006.01) |
| F16H 57/021 | (2012.01) |
| B60K 6/365 | (2007.10) |
| B60K 6/445 | (2007.10) |
| F16H 3/72 | (2006.01) |

(Continued)

(52) U.S. Cl.
CPC ............ *F16H 57/08* (2013.01); *F16H 1/28* (2013.01); *F16H 57/021* (2013.01); *F16H 57/082* (2013.01); *B60K 6/365* (2013.01); *B60K 6/445* (2013.01); *B60Y 2200/92* (2013.01); *B60Y 2400/73* (2013.01); *F16H 3/725* (2013.01); *F16H 37/0806* (2013.01); *F16H 37/0833* (2013.01); *F16H 57/043* (2013.01); *F16H 57/0479* (2013.01); *F16H 2057/085* (2013.01); *F16H 2200/2005* (2013.01); *F16H 2200/2033* (2013.01); *F16H 2200/2035* (2013.01); *F16H 2200/2066* (2013.01); *F16H 2200/2082* (2013.01); *Y10S 903/91* (2013.01)

(58) Field of Classification Search
CPC .......... F16H 57/08; F16H 1/28; F16H 57/021
See application file for complete search history.

(56) References Cited

U.S. PATENT DOCUMENTS 8,808,128 B2 * 8/2014 Sada ..................... B60K 6/40
475/151

FOREIGN PATENT DOCUMENTS

| JP | 2014-159879 | 9/2014 |
| KR | 1020080026837 | 3/2008 |

(Continued)

*Primary Examiner* — Derek D Knight
(74) *Attorney, Agent, or Firm* — Morgan, Lewis & Bockius LLP

(57) ABSTRACT

A rotation support structure of a planetary gear set included in a power transmission system of a vehicle, includes: a first shaft that a sun gear of the planetary gear set is integrally formed at an end portion of; a second shaft that is directly connected to a planet carrier of the planetary gear set which rotatably supports a plurality of pinion gears that are externally meshed with the sun gear and is disposed on a same axis as the first shaft; a plurality of bearings that is disposed in an inner space portion of an external gear and rotatably supports a ring gear of the planetary gear set which is internally meshed with the pinion gears and is integrally connected to the external gear for an output via a retainer; and a first support that is formed in a front housing and rotatably supports the ring gear.

6 Claims, 4 Drawing Sheets

(51) Int. Cl.
*F16H 37/08* (2006.01)
*F16H 57/04* (2010.01)

(56) References Cited

FOREIGN PATENT DOCUMENTS

| KR | 1020160035326 | 3/2016 |
|---|---|---|
| KR | 1020160070423 | 6/2016 |

* cited by examiner

Thrust in ring gear ← + → Thrust in external gear

ROTATION SUPPORT STRUCTURE OF PLANETARY GEAR SET FOR POWER TRANSMISSION SYSTEM

CROSS-REFERENCE TO RELATED APPLICATION

The present application claims priority to and the benefit of Korean Patent Application No. 10-2016-0095526 filed on Jul. 27, 2016, the entire contents of which are incorporated herein by reference.

BACKGROUND OF THE INVENTION

Field of the Invention

The present invention relates to a planetary gear set, and more particularly, to a rotation support structure of a planetary gear set for a power transmission system that supports rotation of the planetary gear set applied to the power transmission system of a vehicle.

Description of Related Art

An environmentally-friendly technology of a vehicle is a core technology which controls a survival of a future automobile industry and advanced car makers have focused their own energy on the development of an environmentally-friendly vehicle to achieve environment and fuel efficiency regulations.

Therefore, each car maker has developed an electric vehicle (EV), a hybrid electric vehicle (HEV), a fuel cell electric vehicle (FCEV), and the like, as a future vehicle technology.

As described above, since a future vehicle has several technical restrictions such as weight, cost, and the like, the car makers have paid attention to a power transmission system as an alternative to solve realistic problems such satisfaction of exhaust gas regulations and enhancement of fuel efficiency performance and are fiercely competing to commercialize the power transmission system.

Thus, in order to improve fuel efficiency performance, the power transmission system applied to the vehicle includes at least one planetary gear set so that the power transmission system has a plurality of gear shift stages.

The planetary gear set has a sun gear, a planet carrier, and a ring gear that are a rotation element. The rotation element is supported by a transmission housing or a front housing. A plurality of bearings are required to support the rotation element.

The power transmission system including multi-stage transmission over 8 stages (e.g., an eighth speed) was developed recently so that the number of the planetary gear set was increased. Therefore, there are lots of constraints when a rotation support structure for the planetary gear set is designed within the transmission housing that has a narrow space.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a rotation support structure of a planetary gear set for a power transmission system that is capable of reducing an overall length by integrally connecting an external gear for an output to a ring gear of the planetary gear set applied to the power transmission system of a vehicle and by accommodating a plurality of bearings in an inner space formed in the external gear so that the rotation support structure supports the planetary gear set rotated in a front housing.

The present invention provides the rotation support structure of the planetary gear set for the power transmission system that is capable of offsetting thrusts (or axial loads) by placing directions of helix angles of gear teeth included in the ring gear in the same direction as directions of helix angles of gear teeth included in the external gear.

The present invention provides the rotation support structure that is capable of improving workability and mass productivity using integration of the ring gear and the external gear by a retainer and is capable of reducing gear noise and increasing transmission efficiency of a gear using grinding of gear teeth and broaching processing for gear teeth.

Further, the present invention provides the rotation support structure that is capable of preventing non-uniform gear tooth meshing due to a moment of the external gear, the gear noise, and reduction in bearing life and of reducing an installation space of the bearing and the bearing size by repeating arrangement of the bearings in a radial direction using the inner space of the external gear.

An exemplary embodiment of the present invention may provide the rotation support structure of the planetary gear set for the power transmission system, including: a first shaft that a sun gear of the planetary gear set is integrally formed at an end portion of; a second shaft that is directly connected to a planet carrier of the planetary gear set which rotatably supports a plurality of pinion gears that are externally meshed with the sun gear and is disposed on the same axis as the first shaft; a plurality of bearings that is disposed in an inner space portion of an external gear and rotatably supports a ring gear of the planetary gear set which is internally meshed with the pinion gears and is integrally connected to the external gear for an output via a retainer; and a first support that is formed in a front housing and rotatably supports the ring gear.

The inner space portion is formed may be a side opposite to a side at which the ring gear is disposed, an inner peripheral portion and an outer peripheral portion may be integrally formed at an inside and an outside in a radial direction of the inner space portion corresponding to an inside and an outside in a radial direction of the first support, a first bearing of the bearings may be disposed between the inside in the radial direction of the first support and the inner peripheral portion, and a second bearing of the bearings may be disposed between the outside in the radial direction of the first support and the outer peripheral portion.

The first bearing may be fixed in an axial direction by a snap ring that is installed in the inner peripheral portion.

A center of the first bearing may be moved by a certain distance toward the front housing from a center of the external gear, and a center of the second bearing may be moved by a certain distance toward the planetary gear set from the center of the external gear.

An inner peripheral portion of the external gear may be rotatably supported by a third bearing disposed between the second shaft and the inner peripheral portion.

The planet carrier may be rotatably supported by a fourth bearing disposed between the planet carrier and a second support that is formed in a transmission housing and is formed at a side opposite to a side at which the front housing is disposed.

The ring gear may be an internal gear, and directions of helix angles of gear teeth included in the ring gear may be formed in the same direction as directions of helix angles of gear teeth included in the external gear.

The rotation support structure of the planetary gear set for the power transmission system according to the exemplary embodiment of the present invention may reduce an overall length by integrally forming the ring gear of the planetary gear set with the external gear for the output using the retainer and by accommodating the bearings in the inner space of the external gear so that the rotation support structure supports the planetary gear set rotated in the front housing.

The exemplary embodiment of the present invention may reduce the installation space of the bearing and the bearing size and may increase efficiency of the bearing by repeating arrangement of two bearings in a radial direction within the inner space.

The exemplary embodiment of the present invention may improve workability and mass productivity by connecting the external gear to the ring gear using the retainer, and may reduce the gear noise and may increase transmission efficiency of the gear using grinding processing for gear teeth and broaching processing for gear teeth.

The exemplary embodiment of the present invention may offset thrusts (or axial loads) by placing directions of helix angles of gear teeth included in the ring gear in the same direction as directions of helix angles of gear teeth included in the external gear, thereby increasing life and efficiency of the bearing.

Further, the exemplary embodiment of the present invention may prevent non-uniform tooth meshing due to a moment of the external gear, the gear noise, and reduction in the bearing life by accommodating two bearings in the inner space of the external gear.

In addition, effects that can be obtained or expected from exemplary embodiments of the present invention are directly or suggestively described in the following detailed description. In other words, various effects expected from exemplary embodiments of the present invention will be described in the following detailed description.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 1 is a schematic view showing an example of a power transmission system of a vehicle that an exemplary embodiment of the present invention is applied to.

Figure 1:
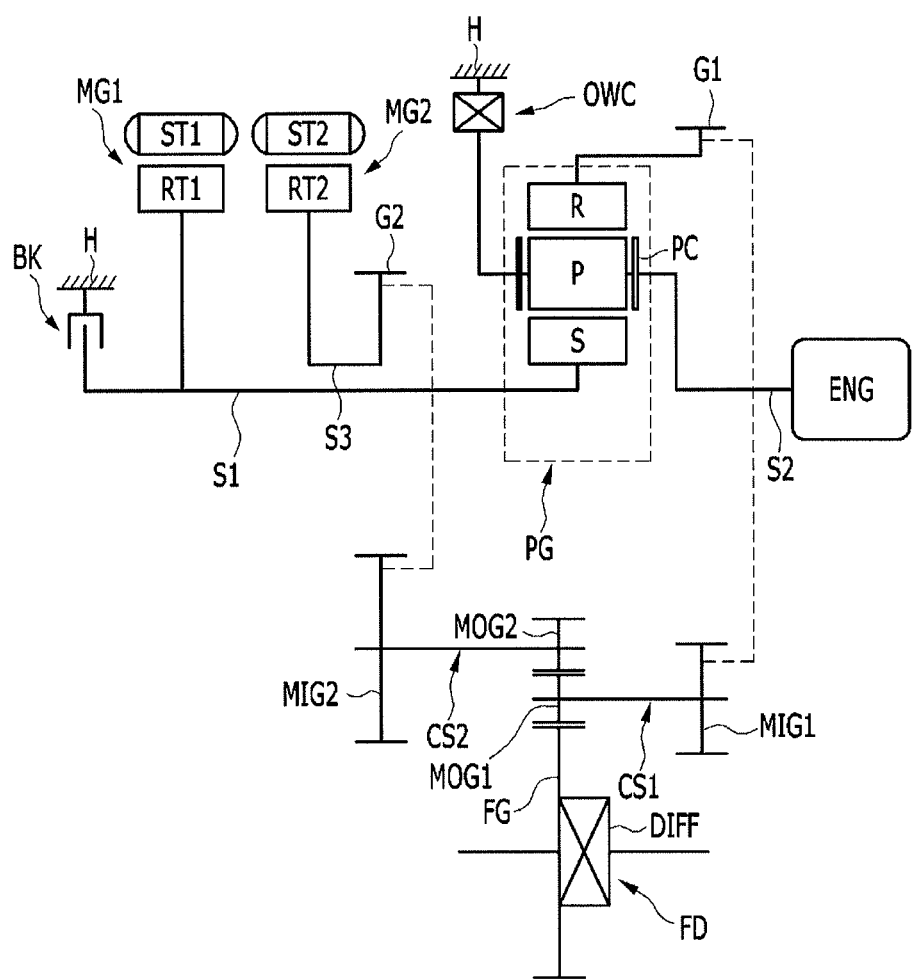

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

With reference to the accompanying drawings, the present invention will be described in order for those skilled in the art to be able to implement the invention. As those skilled in the art would realize, the described embodiments may be modified in various different ways, all without departing from the spirit or scope of the present invention.

The description is to be regarded as illustrative in nature and not restrictive. Like reference numerals designate like elements throughout the specification.

In the following description, dividing names of components into first, second and the like is to divide the names because the names of the components are the same as each other and an order thereof is not particularly limited.

FIG. 1 is a schematic view showing an example of a power transmission system of a vehicle that an exemplary embodiment of the present invention is applied to.

For example, the power transmission system may be a power transmission system (e.g., a power transmission apparatus) for a hybrid vehicle.

Referring to FIG. 1, a power source that includes an engine ENG, a first motor/generator MG1, and a second motor/generator MG2 may be provided to the power transmission system. The power transmission system includes a planetary gear set PG that is a power splitter.

The planetary second motor PG, the first motor/generator MG1, the second motor/generator MG2, and the engine ENG may have the same axis. The planetary second motor PG, the first motor/generator MG1, and the second motor/generator MG2 may be sequentially disposed at a rear side of the engine ENG.

The engine ENG, which is a main power source, may be a gasoline engine or a diesel engine that uses a fossil fuel. Rotational power output from the engine ENG may be input to the power transmission system through a second shaft (or an input shaft) S2.

The planetary gear set PG, which is a single pinion planetary gear set, may include a sun gear S, a planet carrier PC that rotatably supports a pinion gear P externally gear-meshed with the sun gear S, and a ring gear R internally meshed with the pinion gear P that are rotation elements.

The sun gear S may be directly connected to the first motor/generator MG1 through a first shaft (e.g., a first motor shaft) S1, the planet carrier PC may be directly connected to the second shaft S2 to act as an input element, and the ring gear R may be directly connected to an external gear (e.g., an output gear) G1 for an output to act as an output element.

Further, the sun gear S may be connected to a transmission housing H through a brake BK to act as a selective fixing element, and the planet carrier PC may be selectively connectable to the transmission housing H through a one way clutch OWC to prevent reverse rotation of the planet carrier PC.

The first motor/generator MG1 and the second motor/generator MG2 may perform motor function and generator function, and may include a first stator ST1 and a second stator ST2 that are fixed to the transmission housing, a first rotor RT1 that rotates in the first stator ST1, and a second rotor RT2 that rotates within the second stator ST2.

The first rotor RT1 may be directly connected to the first shaft S1, and the second rotor RT2 may be directly connected to a third shaft (e.g., a second motor shaft) S3 that is superposed on an outer circumferential surface of the first shaft S1 without rotational interference. The third shaft S3 may be directly connected to another external gear G2 for the output.

Rotational power output from two external gears G1 and G2 may be transmitted to a final reduction mechanism FD including a differential (e.g., a differential gear mechanism) DIFF through a first counter shaft CS1 and a second counter shaft CS2 that are disposed in parallel with the second shaft S2 and the third shaft S3 at predetermined intervals.

A first middle input gear MIG1 and a second middle input gear MIG2 that are externally meshed with two external gears G1 and G2 and a first middle output gear MOG1 and a second middle output gear MOG2 that are externally meshed with a final reduction gear FG of the final reduction mechanism FD may be connected to the first counter shaft CS1 and the second counter shaft CS2.

Accordingly, the first counter shaft CS1 may transmit rotational power transmitted from the planetary gear set PG to the final reduction gear FG, and the second counter shaft CS2 may transmit rotational power transmitted from the second motor/generator MG2 to the final reduction gear FG.

A power transmission system for the hybrid vehicle that includes a rotation support structure for a planetary gear set according to an exemplary embodiment of the present invention may be a conventional power transmission apparatus of the hybrid vehicle, and thus a detailed description thereof is omitted herein.

Figure 2:
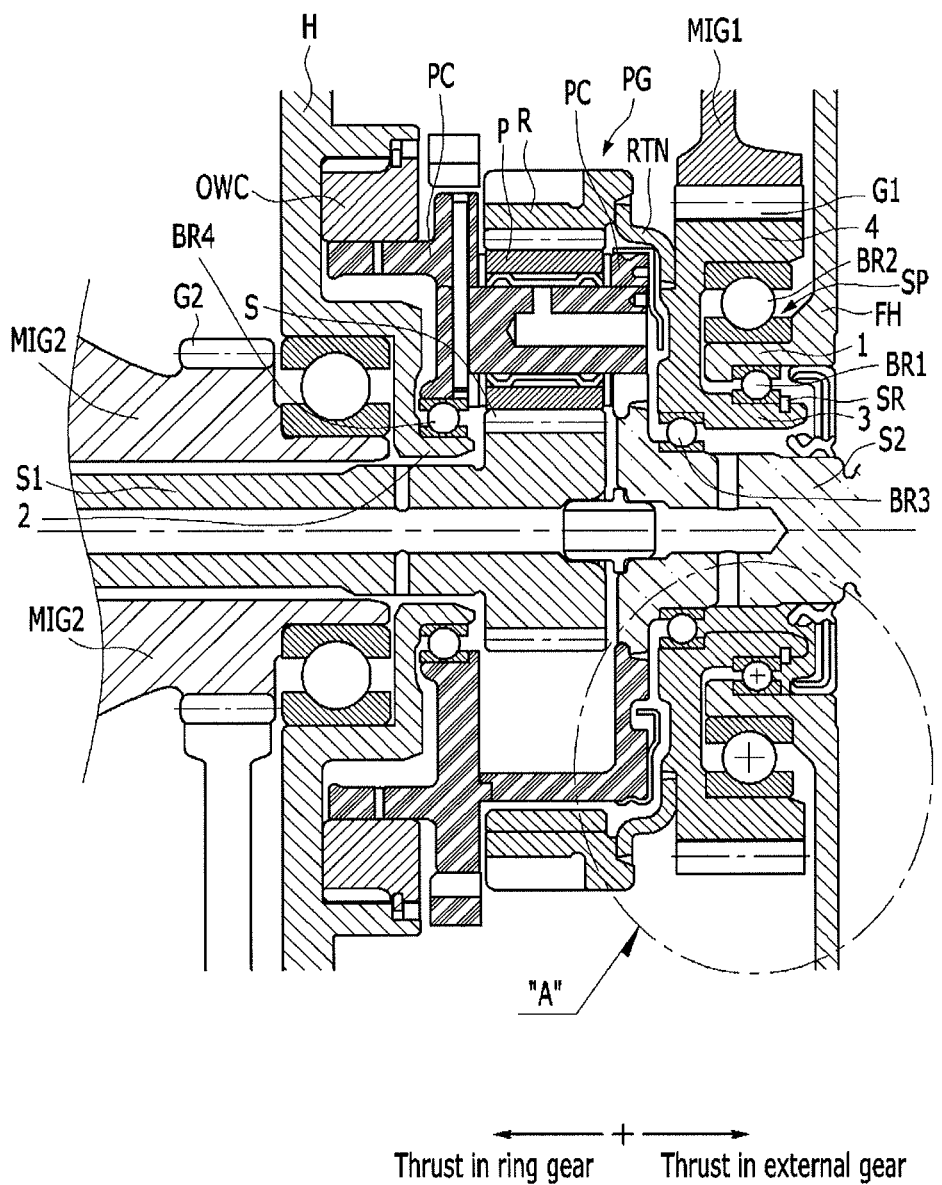
FIG. 2 is a cross-sectional view showing a rotation support structure of a planetary gear set according to an exemplary embodiments of the present invention.
Figure 3:
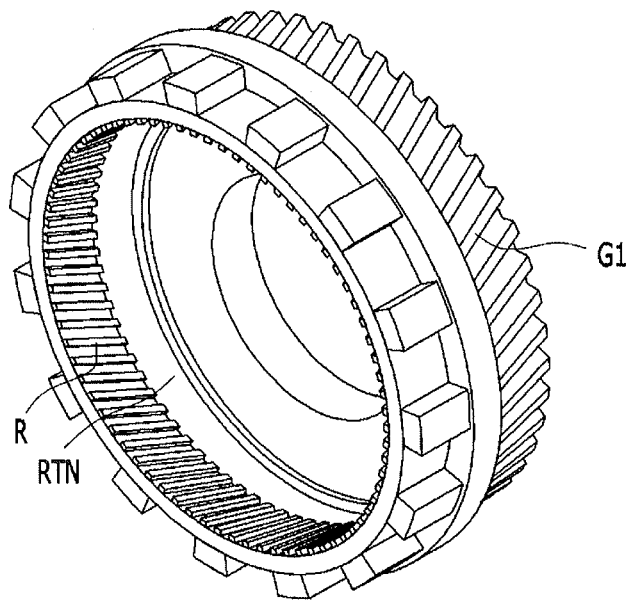
FIG. 3 is an assembled perspective view of a ring gear and an external gear applied to the rotation support structure.

FIG. 2 is a cross-sectional view showing the rotation support structure of the planetary gear set according to the exemplary embodiments of the present invention, and FIG. 3 is an assembled perspective view of a ring gear and an external gear applied to the rotation support structure.

Referring to FIG. 2, the sun gear S of the planetary gear set PG may be integrally formed at an end portion of the first shaft S1.

The planet carrier PC may rotatably support a plurality of pinion gears P that are externally meshed with the sun gear S and may be directly connected to the second shaft S2 that is disposed on the same axis as the first shaft S1 and is connected to the engine ENG.

Referring to FIGS. 2 and 3, the ring gear R may be internally meshed with the pinion gears P, may be integrally connected to the external gear G1 for the output via a retainer RTN, and may be rotatably supported by two bearings BR1 and BR2 disposed in an inner space portion SP of the external gear G1 and a first support 1 formed in a front housing FH.

The inner space portion SP may be formed in a side opposite to a side at which the ring gear R is disposed. An inner peripheral portion 3 and an outer peripheral portion 4 may be integrally formed at an inside and an outside in a radial direction of the inner space portion SP (or the first support 1).

A first bearing BR1 of two bearings may be disposed between the inside in the radial direction of the first support 1 and the inner peripheral portion 3, and a second bearing BR2 of two bearings may be disposed between the outside in the radial direction of the first support 1 and the outer peripheral portion 4.

Two bearings BR1 and BR2 may be repeatedly disposed in a radial direction within the inner space portion SP, thereby preventing tilting of the second bearing BR2 due to a moment of the external gear G1 and preventing reduction in the bearing life.

The first bearing BR1 may be fixed in an axial direction by a snap ring SR that is installed in the inner peripheral portion 3.

The ring gear R may be an internal gear. Directions of helix angles of gear teeth included in the ring gear R may be placed in the same direction as directions of helix angles of gear teeth included in the external gear G1, thereby offsetting thrusts (or axial loads).

Figure 4:
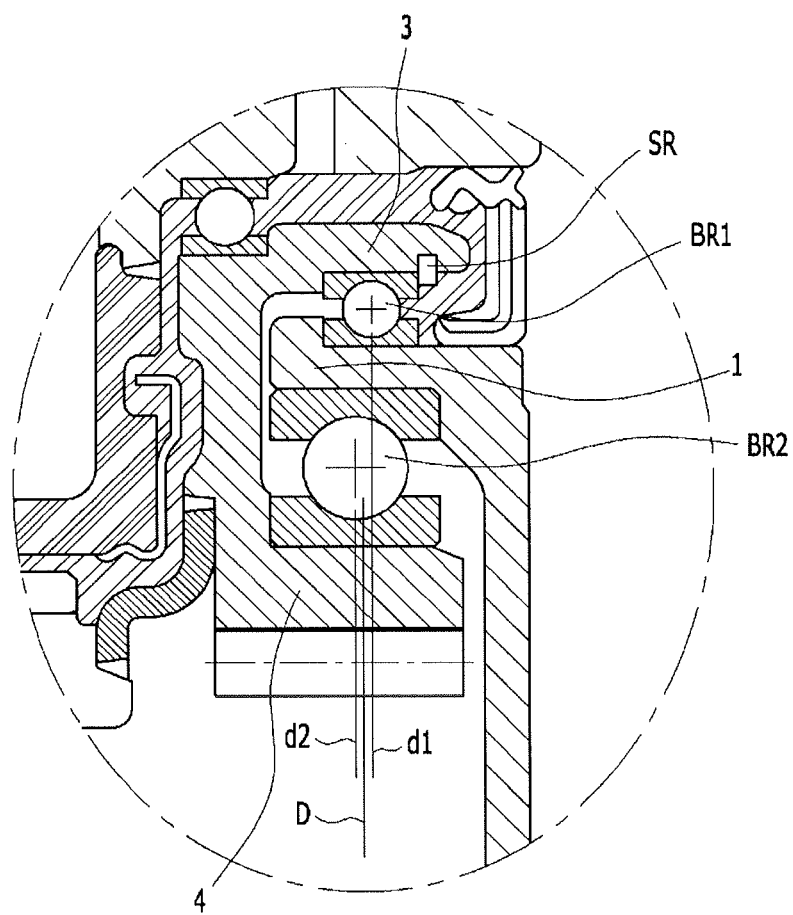
FIG. 4 is an enlarged view of a part A of FIG. 2.

FIG. 4 is an enlarged view of a part A of FIG. 2. Referring to FIG. 4, a center d1 of the first bearing BR1 may be moved by a certain distance (or a predetermined distance) toward the front housing FH from a center D of the external gear G1, and a center d2 of the second bearing BR2 may be moved by a certain distance toward the planetary gear set PG from the center D of the external gear G1.

Referring back to FIG. 2, the inner peripheral portion 3 of the external gear G1 may be rotatably supported by a third bearing BR3 disposed between the second shaft S2 and the inner peripheral portion 3.

The planet carrier PC may be rotatably supported by a fourth bearing BR4 disposed between the planet carrier PC and a second support 2 that is formed in the transmission housing H and is formed at a side opposite to a side at which the front housing FH is disposed.

According to the exemplary embodiments of the present invention, the ring gear R may be connected to the external gear G1 via the retainer RTN Therefore, grinding processing for gear teeth of the external gear G1 and broaching processing for the ring gear R may be implemented. The grinding processing and the broaching processing may be not used when an outer diameter of the external gear G1 is less than an outer diameter of the ring gear R and the external gear is integrally formed with the ring gear.

According to the exemplary embodiments of the present invention, the ring gear R, the external gear G1, and the retainer RTN that is disposed between the ring gear and the external gear and is ring-shaped may be integrally formed by a welding method.

Accordingly, even if the outer diameter of the ring gear R is greater than the outer diameter of the external gear G1, the gear noise may be reduced and efficiency of the gear may be increased by using the grinding processing and the broaching processing.

According to the exemplary embodiments of the present invention, directions of helix angles of gear teeth included in the ring gear R and directions of helix angles of gear teeth included in the external gear G1 may be formed in the same direction so that thrust (or axial load) of the ring gear R and thrust of the external gear G1 are generated in opposite directions to each other. Thus, the thrusts may be cancelled out so that load of the bearing is reduced and efficiency of a transmission included in the vehicle is increased.

According to the exemplary embodiments of the present invention, the external gear G1 may be rotatably supported by two bearings BR1 and BR2 that is disposed between the front housing FH and the inner space portion SP and is disposed at the inside and the outside in the radial direction of the inner space portion SP. Thus, tilting of the bearing due to the moment of the external gear G1 may be suppressed so that reduction in the bearing life is prevented, and an installation space of the bearing and the bearing size may be reduced such that efficiency of the bearing may be increased.

When a single bearing is disposed between the front housing FH and the inner space portion SP, gear tooth meshing may become non-uniform due to the moment of the external gear G1 so that gear noise may be excessively generated or the bearing life may be drastically reduced.

The second bearing BR2 may be assembled at an inner side of the front housing FH, and the first bearing BR1 should be fixed by the snap ring SR so that the first bearing BR1 may be assembled in advance at an outer side of the front housing FH.

As shown in FIG. 4, the center d1 of the first bearing BR1 may be located at a right side of the center D of the external gear G1 (or at a side at which the front housing is disposed) and the center d2 of the second bearing BR2 may be located at a left side of the center D of the external gear G1 (or at a side at which the planetary gear set is disposed), thereby obtaining the above effect according to the exemplary embodiment of the present invention.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "interior", "exterior", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A rotation support structure of a planetary gear set included in a power transmission system of a vehicle, comprising:
a first shaft, wherein a sun gear of the planetary gear set is integrally formed at an end portion thereof;
a second shaft that is directly connected to a planet carrier of the planetary gear set which rotatably supports a plurality of pinion gears that are externally meshed with the sun gear and is disposed on a same axis as the first shaft;
a plurality of bearings that is disposed in an inner space portion of an external gear and rotatably supports a ring gear of the planetary gear set which is internally meshed with the pinion gears and is integrally connected to the external gear for an output via a retainer; and
a first support that is formed in a front housing and rotatably supports the ring gear,
wherein the inner space portion is formed in a side opposite to a side at which the ring gear is disposed, an inner peripheral portion and an outer peripheral portion are integrally formed at an inside and an outside in a radial direction of the inner space portion corresponding to an inside and an outside in a radial direction of the first support, a first bearing of the bearings is disposed between the inside in the radial direction of the first support and the inner peripheral portion, and a second bearing of the bearings is disposed between the outside in the radial direction of the first support and the outer peripheral portion.

2. The rotation support structure of claim 1, wherein the first bearing is fixed in an axial direction by a snap ring that is mounted in the inner peripheral portion.

3. The rotation support structure of claim 1, wherein a center of the first bearing is moved by a predetermined distance toward the front housing from a center of the external gear, and a center of the second bearing is moved by a predetermined distance toward the planetary gear set from the center of the external gear.

4. The rotation support structure of claim 1, wherein an inner peripheral portion of the external gear is rotatably supported by a third bearing disposed between the second shaft and the inner peripheral portion.

5. The rotation support structure of claim 1, wherein the planet carrier is rotatably supported by a fourth bearing disposed between the planet carrier and a second support that is formed in a transmission housing and is formed at a side opposite to a side at which the front housing is disposed.

6. The rotation support structure of claim 1, wherein the ring gear is an internal gear, and directions of helix angles of gear teeth included in the ring gear is formed in a same direction as directions of helix angles of gear teeth included in the external gear.

\* \* \* \* \*